(12) United States Patent
Gao et al.

(10) Patent No.: US 9,200,184 B2
(45) Date of Patent: Dec. 1, 2015

(54) CHAIN EXTENDED EPOXY TO IMPROVE ADHESION OF CONDUCTIVE DIE ATTACH FILM

(71) Applicant: HENKEL IP & HOLDING GMBH, Duesseldorf (DE)

(72) Inventors: Junbo Gao, Irvine, CA (US); Gina Hoang, Garden Grove, CA (US)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 81 days.

(21) Appl. No.: 13/833,322

(22) Filed: Mar. 15, 2013

(65) Prior Publication Data

US 2013/0306916 A1  Nov. 21, 2013

Related U.S. Application Data

(60) Provisional application No. 61/648,284, filed on May 17, 2012.

(51) Int. Cl.
*H01B 1/02* (2006.01)
*H01B 1/22* (2006.01)
*C09J 9/02* (2006.01)
*C09J 163/00* (2006.01)
*C08G 59/18* (2006.01)
*C08G 73/12* (2006.01)
*C09J 179/08* (2006.01)

(52) U.S. Cl.
CPC ............... *C09J 9/02* (2013.01); *C08G 59/182* (2013.01); *C08G 73/124* (2013.01); *C08G 73/125* (2013.01); *C08G 73/126* (2013.01); *C08G 73/127* (2013.01); *C09J 163/00* (2013.01); *C09J 179/085* (2013.01)

(58) Field of Classification Search
CPC ............ C08K 3/08; C08L 63/00; C09J 63/00; C08G 59/54; C08G 59/182; H01L 2924/0002; H01L 23/295
USPC ........ 252/500, 514, 512; 156/307.1; 428/325; 257/712; 523/457
See application file for complete search history.

(56) References Cited

U.S. PATENT DOCUMENTS

| | | | |
|---|---|---|---|
| 2004/0000712 A1* | 1/2004 | Wilson | C08G 59/54 257/712 |
| 2004/0169162 A1 | 9/2004 | Xiao et al. | |
| 2006/0197066 A1 | 9/2006 | Cheng et al. | |
| 2007/0185243 A1* | 8/2007 | Terada | C08G 59/42 523/457 |

FOREIGN PATENT DOCUMENTS

| | | |
|---|---|---|
| JP | 2003109916 A | 4/2003 |
| JP | 2004313366 A | 11/2004 |
| JP | 3617639 B2 | 2/2005 |
| JP | 2005044524 A | 2/2005 |
| JP | 2006258805 A | 9/2006 |
| JP | 2009001604 A | 1/2009 |
| JP | 4635412 B2 | 2/2011 |
| KR | 20090055394 A | 6/2009 |

* cited by examiner

*Primary Examiner* — Khanh Tuan Nguyen
(74) *Attorney, Agent, or Firm* — James J. Cummings

(57) ABSTRACT

A conductive adhesive film is prepared from components comprising a thermosetting resin, a film-forming resin, a conductive filler, and further comprising a chain extended epoxy resin prepared from the reaction of a poly-functional phenol with a combination of a poly-functional aromatic epoxy and a poly-functional aliphatic epoxy (poly-functional includes di-functional). The addition of the chain extended epoxy preserves the adhesiveness of the conductive adhesive film at silver loadings of 80 weight percent or greater.

19 Claims, No Drawings

CHAIN EXTENDED EPOXY TO IMPROVE ADHESION OF CONDUCTIVE DIE ATTACH FILM

BACKGROUND OF THE INVENTION

This invention relates to conductive adhesive compositions for use within the semiconductor industry, particularly for attaching semiconductors dies to substrates.

Adhesive compositions, particularly conductive adhesives, are used for a variety of purposes in the fabrication and assembly of semiconductor packages and microelectronic devices. The more prominent uses are the bonding of integrated circuit chips to lead frames or other substrates, and the bonding of circuit packages or assemblies to printed wire boards.

One format for presenting the conductive adhesive is a self-supporting film, which provides the exact amount of adhesive in the precise area necessary for die bonding. Film adhesives have the advantage of either not flowing, or flowing in a very limited way, only at the time of binding, and can be prepared so that they are relatively tack free to enable handling and repositioning. In one convention, the film adhesive is laminated to the backside of a semiconductor wafer before the wafer is diced into individual semiconductor circuits. Handling and positioning of the film onto the wafer typically takes place at or near room temperature, but the adhesive composition can be adjusted to provide a substantial lack of tack at higher temperatures. Following correct positioning, warming the adhesive to the lamination temperature will provide a suitable tackiness to adhere the adhesive to the wafer for subsequent dicing processes.

High thermal conductivity and electric conductivity are the required performance characteristics for conductive films. These properties are highly dependent on the level of conductive filler in the composition of the film. The conventional conductive filler for these compositions is silver or silver-plated copper. When the silver or silver-plated copper loading exceeds about 80 weight percent, the adhesion of the conductive adhesive film declines with increasing silver loading.

It would be an advantage to provide a conductive adhesive film with sufficient conductive filler to obtain the properties of thermal and electrical conductivity needed, without reducing the adhesive level of the film.

SUMMARY OF THE INVENTION

This invention is a conductive adhesive film prepared from components comprising a thermosetting resin, optionally a film-forming resin, a conductive filler present, and further comprising a chain extended epoxy resin prepared from the reaction of a poly-functional phenol with a combination of a poly-functional aromatic epoxy and a poly-functional aliphatic epoxy (poly-functional includes di-functional). The addition of the chain extended epoxy preserves the adhesiveness of the conductive adhesive film at silver loadings of 80 wt % or greater.

DETAILED DESCRIPTION OF THE INVENTION

The resins used in the preparation of the conductive adhesive film are any of the known thermosetting resins used for adhesives, in combination with a film forming resin. Suitable thermosetting resins include epoxy resins, bismaleimide resins, isocyanurate resins, benzoxazine, bisoxazoline, acrylate resins, and combinations and adducts of these. The preferred thermosetting resins are those with a glass transition temperature higher than 150° C., and preferably higher than 200° C.

As the thermosetting resin, suitable epoxies include those selected from the group consisting of diglycidyl ether of bisphenol A epoxy resin, diglycidyl ether of bisphenol F epoxy resin, epoxy novolac resins, and epoxy cresol resins. Other suitable epoxies include those available from DIC, such as those having the structures:

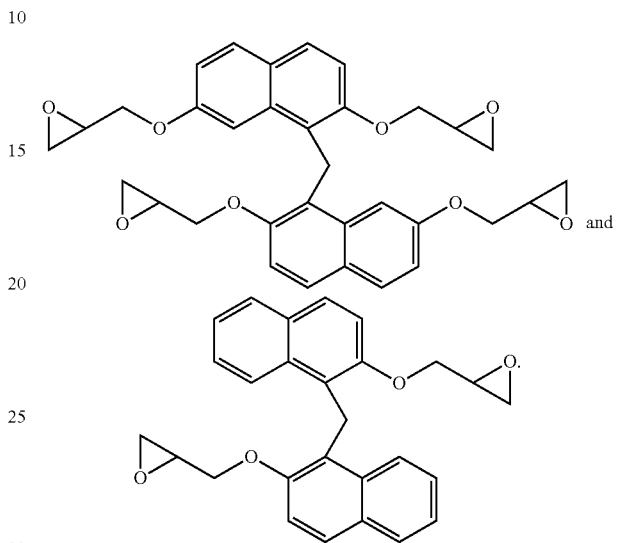

As the thermosetting resin, suitable bismaleimides include 4,4'-diphenylmethane bismaleimide, 4,4'diiphenylether bismaleimide, 4,4'diiphenylsulfone bismaleimide, phenylmethane maleimide, m-phenylene bismaleimide, 2,2'-bis[4-(4-maleimidophenoxy)phenyl]propane, 3,3'-dimethyl-5,5'-diethyl-4,4'-diphenylmethane bismaleimide, 4-methyl-1,3-phenylene bismaleimide, 1,6'-bismaleimide-(2,2,4-trimethyl)hexane, 1,3-bis(3-maleimidophenoxy)benzene, and 1,3-bis(4-maleimidophenoxy)-benzene. These maleimides are available from Daiwakasei Industry Co., Ltd.

As the thermosetting resin, suitable acrylates are available from Sartomer, and include, for example, tris(2-hydroxyethyl)-isocyanurate having the structure:

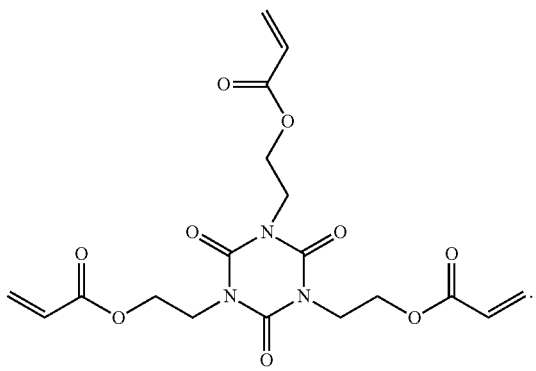 [SMILES: C=CC(=O)OCCn1c(=O)n(CCOC(=O)C=C)c(=O)n(CCOC(=O)C=C)c1=O]

The thermosetting resin will be present in the conductive composition in an amount from about 0.5 wt % (percent by weight) to about 40 wt %, based on the total composition. Preferably, the thermosetting resin will be present in an amount from about 1 wt % to about 30 wt % based on the total composition.

Suitable film forming resins are those considered rubber resins or thermoplastic resins.

As the film forming resin, the adduct of a carboxy-terminated butadiene acrylonitrile and a liquid or viscous (not solid) epoxy resin is suitable. Also suitable are TEISAN-RESIN acrylic ester copolymers available from NAGASE CHEMTEX. Other suitable film forming polymers include poly[(methyl)methacrylate]-b-poly(butyl acrylate)-b-poly[(methyl)methacrylate] and poly[styrene-b-polybutadiene-b-poly[(methyl)methacrylate], available from ARKEMA. It is also suitable to use the butadiene and styrene rubbers known to those skilled in the art as good film forming resins.

When present, the film forming resin will be in the conductive composition in an amount up to about 30 wt % based on the total composition. Preferably, the film forming resin will be present in an amount from about 0.5 wt % to about 20 wt % based on the total composition.

Suitable conductive fillers include carbon black, graphite, gold, silver, copper, platinum, palladium, nickel, aluminum, silver plated copper, silver plated aluminum, bismuth, tin, bismuth-tin alloy, silver plated fiber, silicon carbide, boron nitride, diamond, alumina, and alloy 42 (a nickel and iron alloy in which nickel is present at 42%). In one embodiment, the conductive filler is selected from the group consisting of silver, silver plated copper, copper, gold, and alloy 42. The conductive fillers can be the form of particles or flakes, and can be micro-sized or nano-sized.

The conductive filler will be present in the conductive composition in an amount from about 50 wt % to about 97 wt % based on the total composition. Preferably, the conductive filler will be present in an amount from about 70 wt % to about 97 wt %, and more preferably 80 wt % to about 97 wt %, based on the total composition.

To improve the adhesion of formulations prepared from the above components, a chain extended epoxy is added to the formulation. In one embodiment, the chain extended epoxy is added in an amount from about 1 wt % to about 20 wt % based on the total composition.

The chain extended epoxy is prepared from the reaction of a poly-functional phenol with one or more poly-functional epoxies (poly-functional includes di-functional). Preferably, the chain extended epoxy will be prepared from an aromatic epoxy compound having one or more aryl rings in combination with an aliphatic epoxy.

The chain extension is accelerated by the reaction of hydroxyl, carboxyl, amino and/or thiol groups with epoxide, aziridine or thiirane groups. Suitable catalysts include tetraalkyl-ammonium salts, such as tetrabutylammonium bromide; tetraalkylphonium salts, such as tetra-butylphosphonium acetate; tertiary amines, such as 1, 8-diazabicyclo [5.4.] undec-7-ene; aryl and/or akyl phosphines, such as triphenyiphosphine; and ureas, such as those sold under the trade name VERSAMINE EH-50. The catalyst will be present in the chain extended epoxies in an amount from about 0.01 wt % to about 5 wt % based on the total composition for the chain extended epoxy. Preferably, the catalyst will be present in an amount from about 0.1 wt % to about 3 wt % based on the total composition for the chain extended epoxy.

Suitable poly-functional aromatic epoxies having one or more aryl rings include those having the following structures, in which n and m are numerals denoting repeating units, which will be dependent on the weight average molecular weight of the compound:

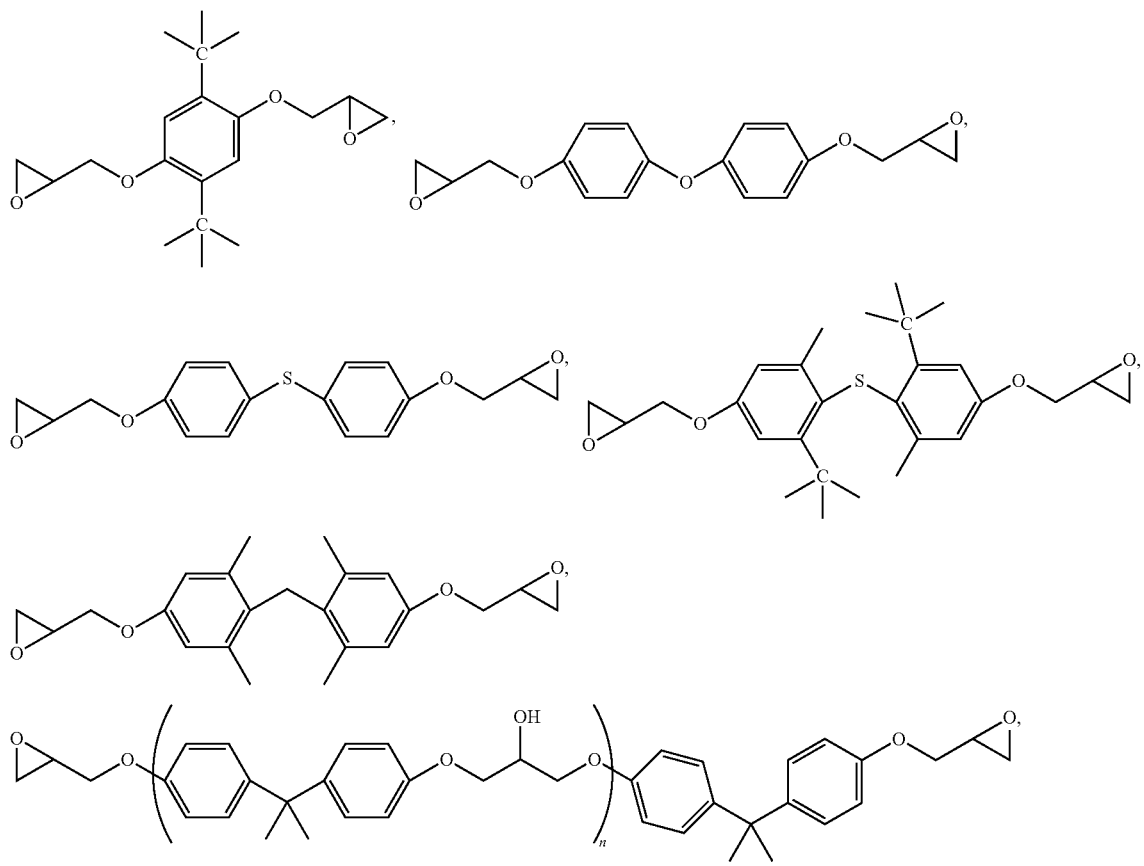

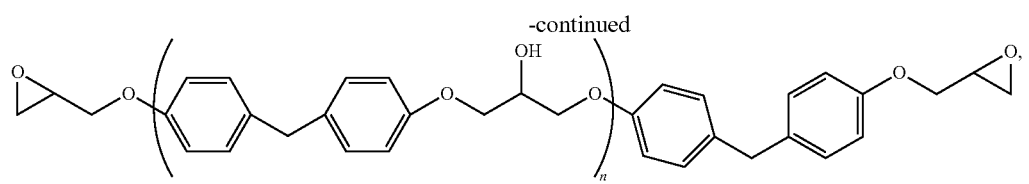
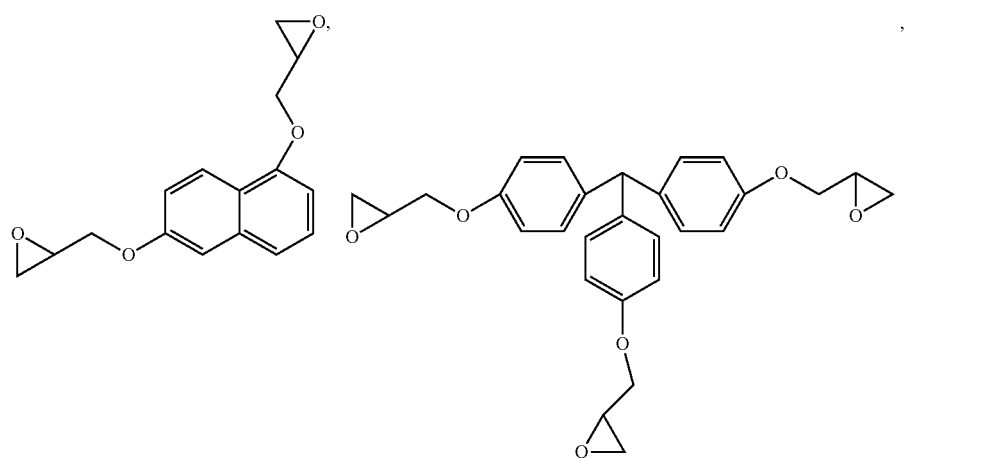
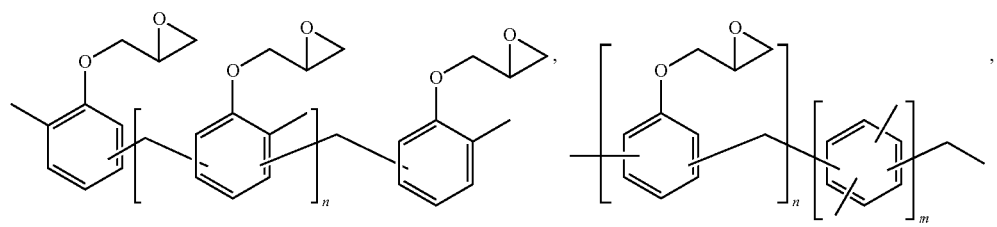
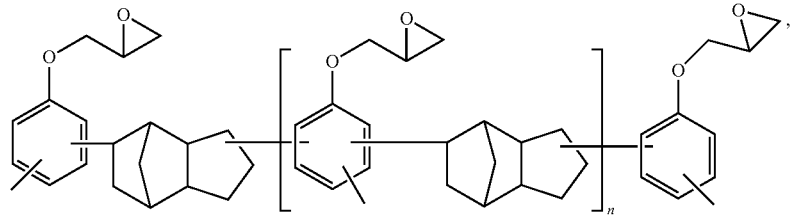
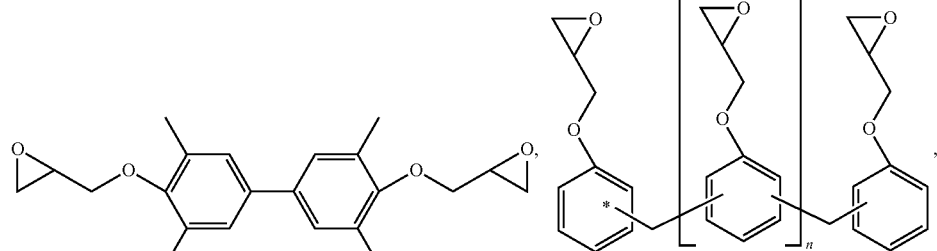
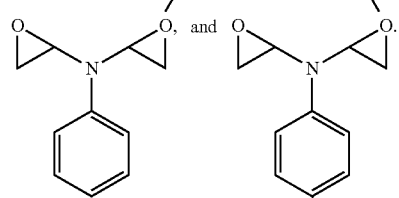
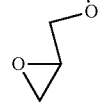

Suitable aliphatic epoxies include those with the following structures:

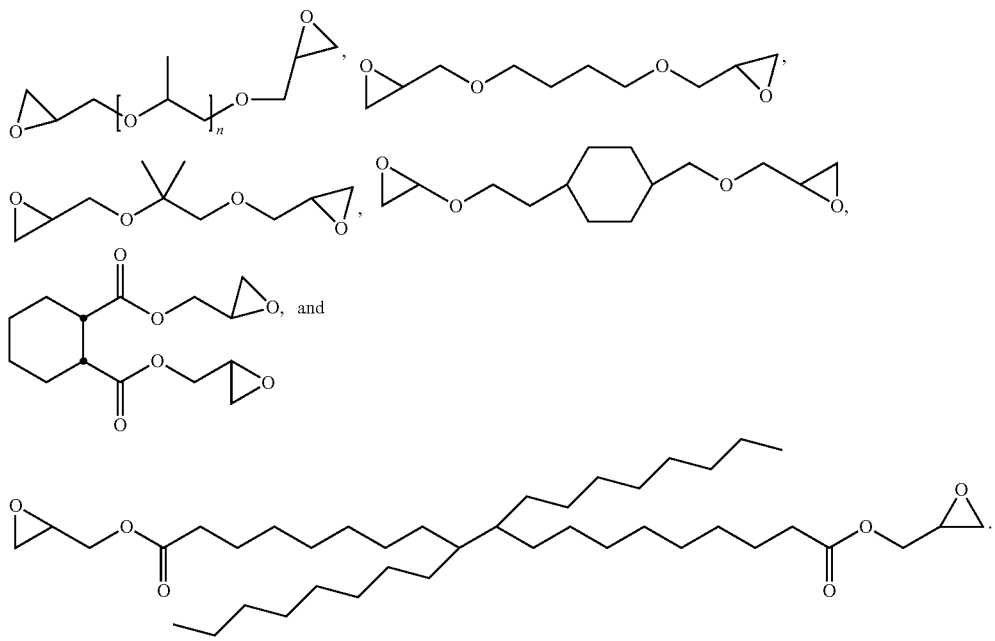

Aromatic epoxies tend to form rigid structures and aliphatic epoxies tend to form flexible structures. The practitioner can tune the rigidity or flexibility of the chain extended epoxy by varying the molar ratio of aromatic epoxy to aliphatic epoxy. In preferred embodiments, the molar ratio of aromatic epoxy to aliphatic epoxy ranges from 0.01 to 100. Preferably, the molar ratio of aromatic epoxy to aliphatic epoxy ranges from 0.02 to 50.

Suitable poly-functional phenols for participation in the chain extension include the following, in which n is a numeral representing repeating units, which will be dependent on the weight average molecular weight of the compound:

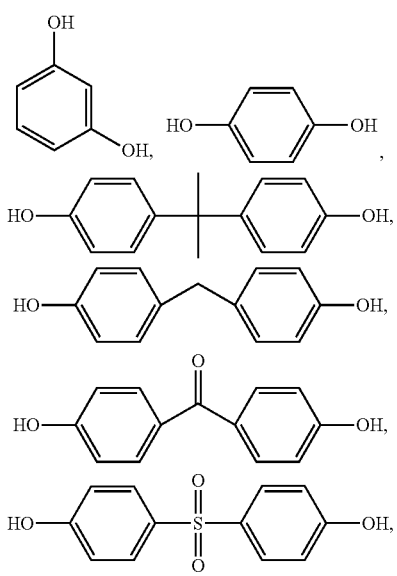

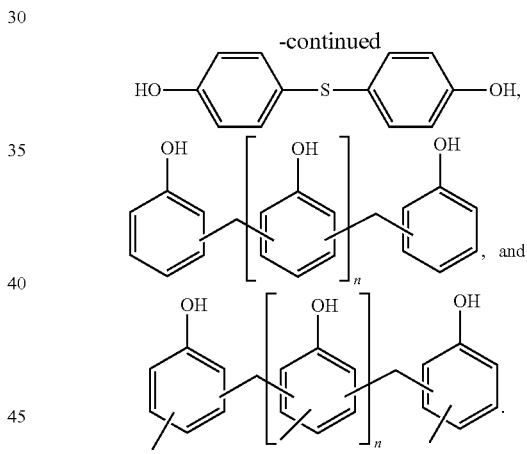

The stoichiometric ratio of the total epoxy functional groups in the reaction for the chain extended epoxy (that is, from both the aromatic epoxy and aliphatic epoxy) to the phenolic functional groups ranges from 0.05 to 30. Preferably the stoichiometric ratio of the total epoxy functional groups to phenolic functional groups ranges from 0.1 to 20. In some embodiments, the stoichiometric ration of the total epoxy functional groups to phenolic functional groups ranges from 0.5 to 10.

EXAMPLE

Two conductive adhesive formulations, A and B, were prepared, having the same components, except that formulation A contained a chain extended epoxy.

The chain extended epoxy used in the adhesive formulations A and B was prepared from the following components, which were reacted at 150° C. for six hours with mechanical mixing:

A. aromatic epoxy (in which n has a value ranging from 0 to 25) (58wt %):

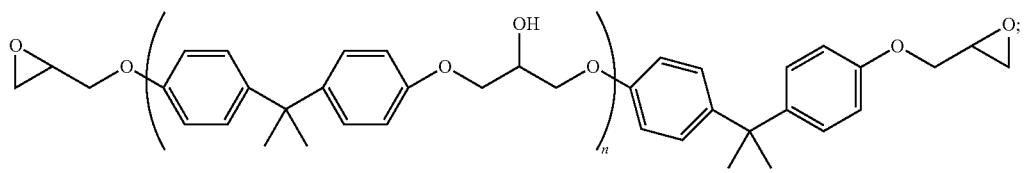

B. aliphatic epoxy (in which n has a value ranging from 0 to 20) (19 wt %)

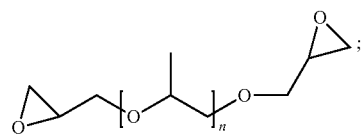

C. phenolic resin (22.5 wt %)

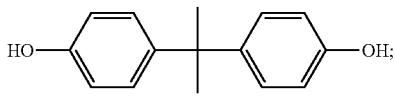

and

D. 0.5wt % ammonium bromide.

In the resulting chain extended epoxy, the molar ratio of the total epoxy functional groups (from both the aromatic epoxy and aliphatic epoxy) to the phenol functional group is 1.4, and the molar ratio of the aromatic epoxy to aliphatic epoxy is 0.5.

The conductive adhesive formulations A and B contained the components reported in the following table.

The compositions were tested for adhesive shear strength according to the following protocol. The test vehicle was a 2mm by 2 mm silicon die adhered to a pre-plated lead frame (copper leadframe plated with nickel, palladium and gold are referred to as PPFs, pre-plated leadframes) as the substrate using the adhesive formulations A and B. Each adhesive was applied to one side of a silicon die at 65° C., after which the adhesive side of the die was contacted to a lead frame and the die adhered to the lead frame using heat at 120° C. and 250 g force for 100 milliseconds. Each assembly of die, adhesive, and lead frame was then heated at 200° C. for one hour to cure the adhesive. The assemblies of die, cured adhesive, and substrate were then tested for die shear strength at 260° C. The results of the die shear tests are recorded in the following table with the adhesive formulation components.

|  | Adhesive Formulation | |
|---|---|---|
|  | A | B |
| bismaleimide (thermoset resin) (BMI2300 from Daiwakasei Industry Co., Ltd.) | 4.33 | 4.33 |
| epoxy (thermoset resin) (EPICLON N-665-EXP from DIC, formerly Daippon Ink and Chemicals) | 2 | 2 |
| polyacrylate (thermoplastic resin) (SG-80H from Nagase Chemtex Corp.) | 4.4 | 8.5 |
| chain extended epoxy (prepared in house) | 4.1 |  |
| dicyandiamide (curing agent) | 0.33 | 0.33 |
| carbonic acid amine (catalyst 313B from Chemica) | 0.15 | 0.15 |
| silver flake (EA2871 from Metalor) | 84.69 | 84.69 |
| Total | 100 | 100 |
| Hot Die Shear Strength g/die | 1169 | 385 |
| Standard deviation | 128 | 76 |
| Failure mode | Cohesive | Cohesive |

The data show that the die shear strength of the formulation containing the chain extended epoxy was significantly improved over the die shear strength of the formulation without the chain extended epoxy.

The invention claimed is:

1. A conductive adhesive composition comprising:
(i) a thermosetting resin,
(ii) optionally, a film-forming resin,
(iii) a conductive filler, and
(iv) a chain extended epoxy prepared from a reaction of a poly-functional phenol with a combination of a poly-functional aromatic epoxy and a poly-functional aliphatic epoxy,
wherein the poly-functional aromatic epoxy is selected from the group consisting of:

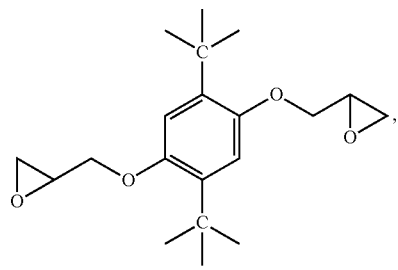

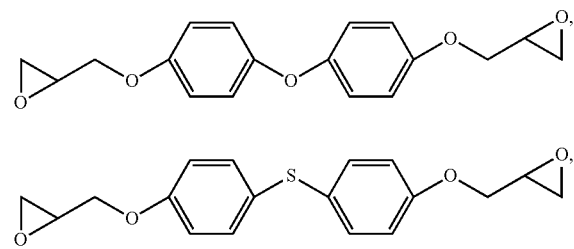

-continued

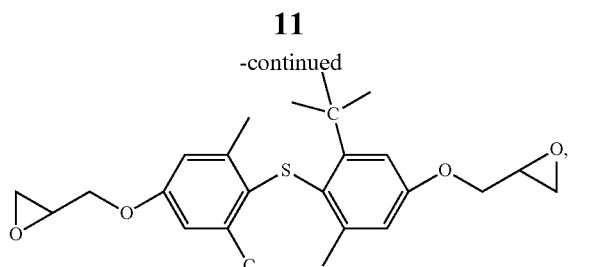

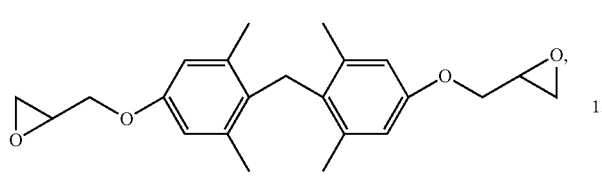

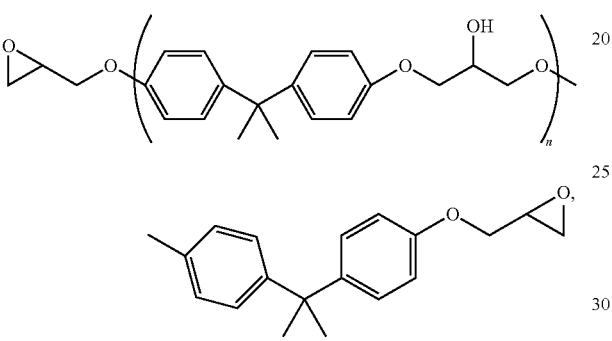

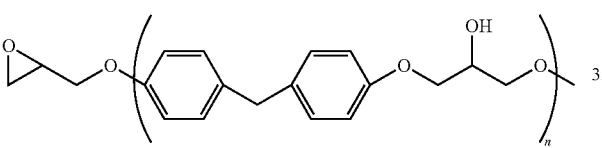

-continued

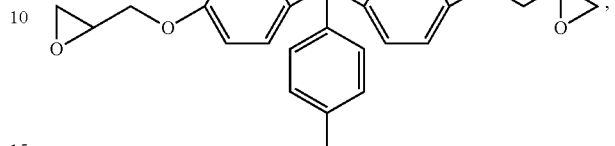

and

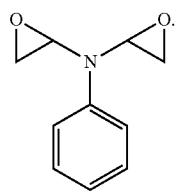

2. The conductive adhesive composition according to claim 1 in which the chain extended epoxy is present in the composition an amount of 1-20 wt % of the total composition.

3. The conductive adhesive composition according to claim 1 in which the poly-functional aliphatic epoxy used to prepare the chain extended epoxy is selected from the group consisting of:

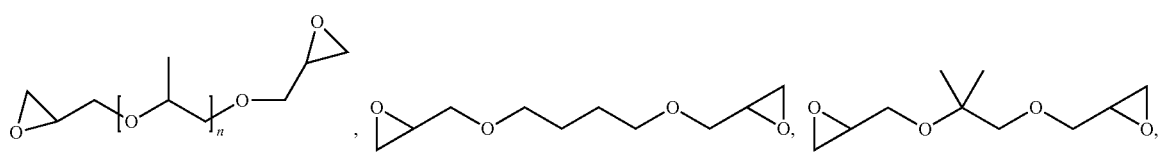

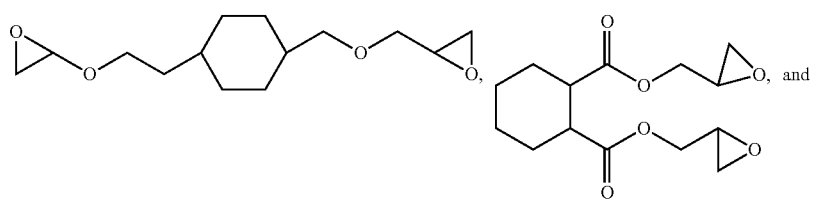

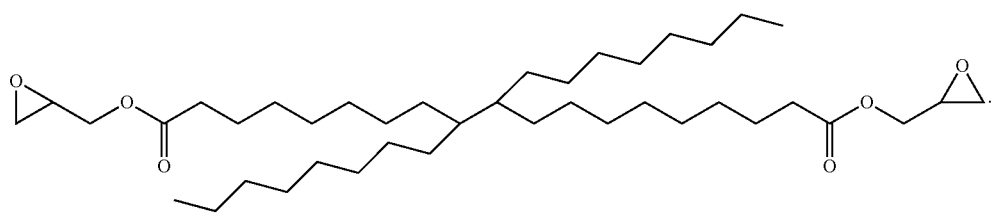

4. The conductive adhesive composition according to claim 1 in which the poly-functional phenol used to prepare the chain extended epoxy is selected from the group consisting of

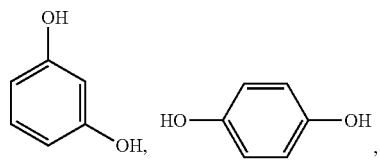

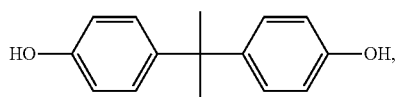

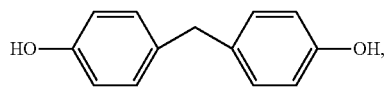

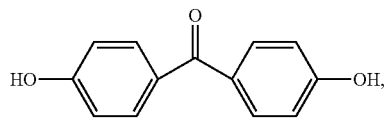

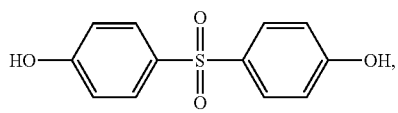

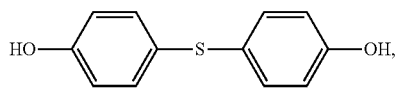

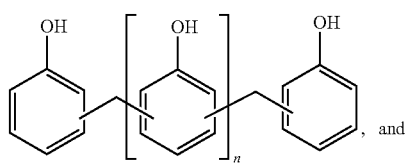, and

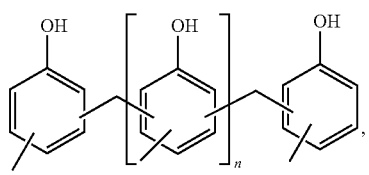

in which n is a numeral denoting repeating units.

5. The conductive adhesive composition according to claim 1 in which the stoichiometric ratio of the total epoxy functional groups to the phenolic functional groups in the chain extended epoxy ranges from 0.05 to 30.

6. The conductive adhesive composition according to claim 1 in which the thermosetting resin is an epoxy selected from the group consisting of diglycidyl ethers of bisphenol A epoxy resin, diglycidyl ethers of bisphenol F epoxy resin, epoxy novolac resins, epoxy cresol resins, and those having the structures:

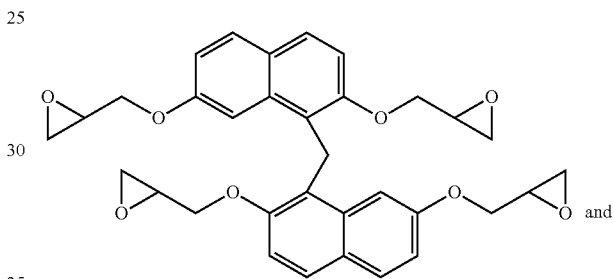 and

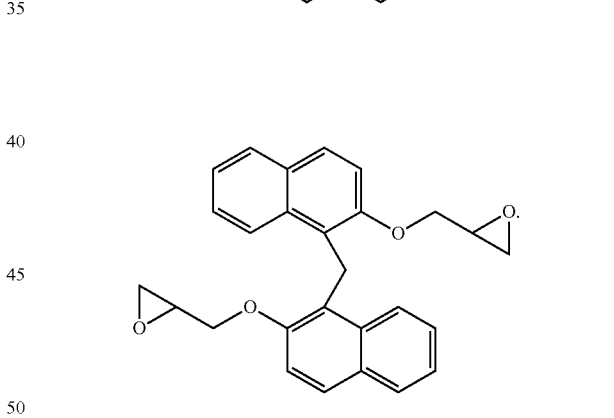

7. The conductive adhesive composition according to claim 6 in which the claim extended epoxy is present in the composing an amount of 1-20 wt % of the total composition.

8. The conductive adhesive composition according to claim 6 in which the poly-functional aliphatic epoxy used to prepare the chain exted epoxy is selected from the group consisting of:

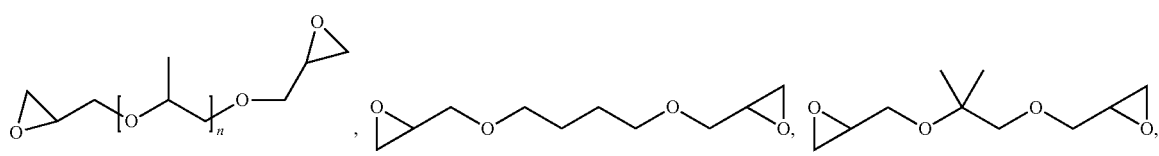

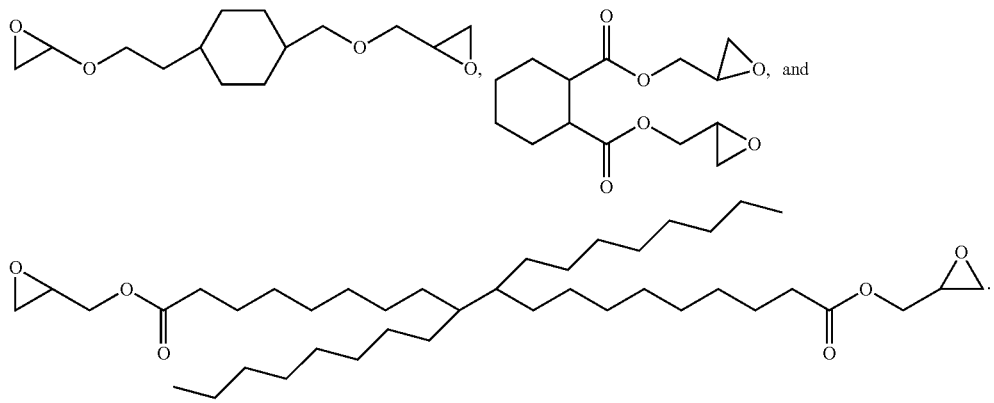

9. The conductive adhesive composition according to claim 6 in which the poly-functional phenol used to prepare the chain extended epoxy is selected from the group consisting of

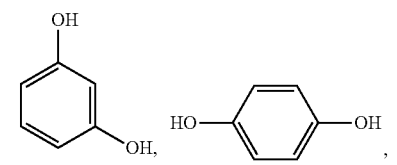

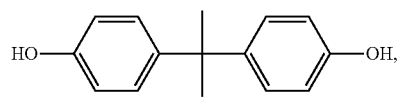

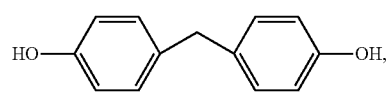

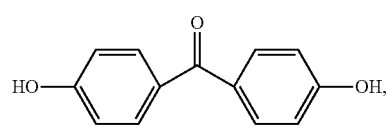

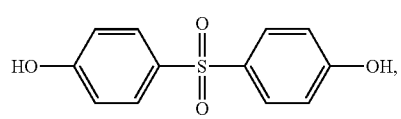

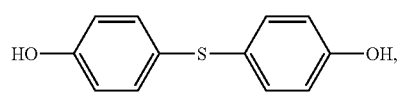

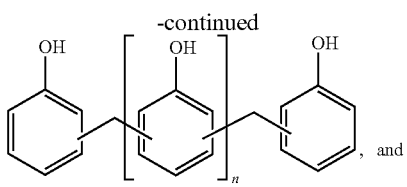

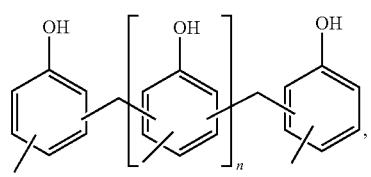

in which n is a numeral denoting repeating units.

10. The conductive adhesive composition according to claim 6 in which the stoichiometric ratio of the total epoxy functional groups to the phenolic functional groups in the chain extended epoxy ranges from 0.05 to 30.

11. The conductive adhesive composition according to claim 6 in which the epoxy is present in an amount from about 0.5 wt % to about 40 wt % of the total composition.

12. The conductive adhesive composition according to claim 1 in which the thermosetting resin is a bismaleimide selected from the group consisting of 4,4'-diphenylmethane bismaleimide, 4,4'diiphenylether bismaleimide, 4,4'diiphenylsulfone bismaleimide, phenylmethane maleimide, m-phenylene bismaleimide, 2,2'-bis[4-(4-maleimidophenoxy)phenyl]propane, 3,3'-dimethyl-5,5'-diethyl-4,4'-diphenylmethane bismaleimide, 4-methyl-1,3-phenylene bismaleimide, 1,6'-bismaleimide-(2,2,4-trimethyl)hexane, 1,3-bis(3-maleimidophenoxy)benzene, and 1,3-bis(4-maleimidophenoxy)-benzene.

13. The conductive adhesive composition according to claim 1 in which the thermosetting resin is an acrylate having the structure

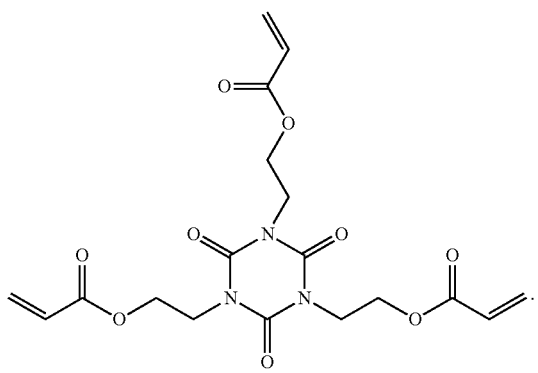 [SMILES: C=CC(=O)OCCn1c(=O)n(CCOC(=O)C=C)c(=O)n(CCOC(=O)C=C)c1=O]

14. The conductive adhesive composition according to claim 1 in which the thermosetting resin is present in an amount from about 0.5 wt % to about 40 wt % of the total composition.

15. The conductive adhesive composition according to claim 1 in which the film forming resin is present and is selected from the group consisting of the adduct of a carboxy-terminated butadiene acrylonitrile and a liquid or viscous epoxy resin;
poly[(methyl)methacrylate]-b-poly(butyl acrylate)-b-poly[(methyl)methacrylate]; poly[styrene-b-polybutadiene-b-poly[(methyl)methacrylate], butadiene rubbers, and styrene rubbers.

16. The conductive adhesive composition according to claim 15 in which the film forming resin is present in the conductive composition in an amount up to about 30 wt % of the total composition.

17. The conductive adhesive composition according to claim 1 in which the conductive filler is selected from the group consisting of carbon black, graphite, gold, silver, copper, platinum, palladium, nickel, aluminum, silver plated copper, silver plated aluminum, bismuth, tin, bismuth-tin alloy, silver plated fiber, silicon carbide, boron nitride, diamond, alumina, and alloy 42.

18. The conductive adhesive composition according to claim 1 in which the conductive filler is present in the conductive composition in an amount of 80 wt % or greater of the total composition.

19. A conductive adhesive composition comprising:
(i) a thermosetting resin selected from the group consisting of diglycidyl ethers of bisphenol A epoxy resin, diglycidyl ethers of bisphenol F epoxy resin, epoxy novolac resins, epoxy cresol resins, and those having the structures:

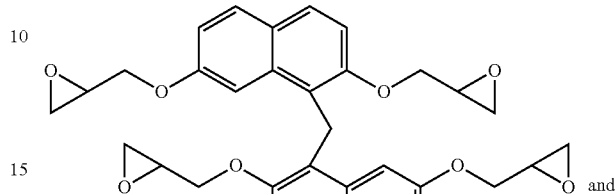 and

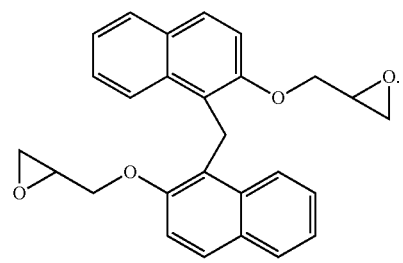

(ii) optionally, a film-forming resin,
(iii) a conductive filler, and
(iv) a chain extended epoxy prepared from a reaction of
(1) a polyfunctional aromatic epoxy selected from the group consisting of:

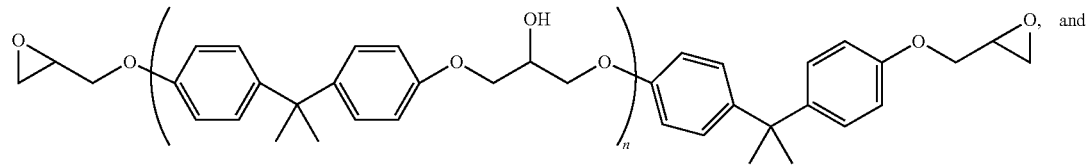 and

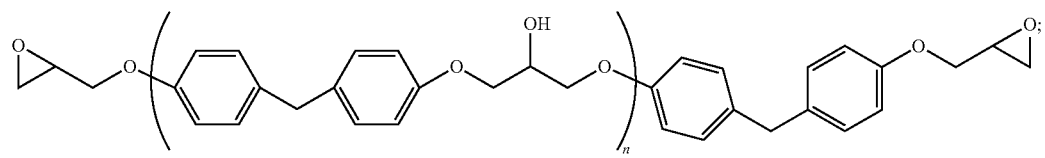

(2) a poly-functional phenol; and
(3) a poly-functional aliphatic epoxy:

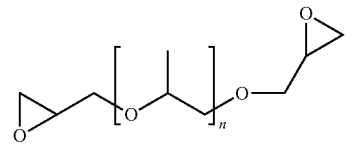

* * * * *